United States Patent
Hung et al.

(10) Patent No.: US 8,788,133 B2
(45) Date of Patent: Jul. 22, 2014

(54) CLEANING ROBOT AND CONTROL METHOD THEREOF

(71) Applicant: MSI Computer (Shenzhen) Co., Ltd., Shenzhen (CN)

(72) Inventors: Shih-Che Hung, New Taipei (TW); Yao-Shih Leng, New Taipei (TW)

(73) Assignee: MSI Computer (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 13/727,298

(22) Filed: Dec. 26, 2012

(65) Prior Publication Data
US 2013/0231819 A1 Sep. 5, 2013

Related U.S. Application Data

(60) Provisional application No. 61/606,106, filed on Mar. 2, 2012.

(30) Foreign Application Priority Data

Sep. 3, 2012 (TW) .............................. 101131975 A (51) Int. Cl.
G05D 1/00 (2006.01)
A47L 11/40 (2006.01)
G05D 1/02 (2006.01)

(52) U.S. Cl.
CPC ......... *A47L 11/4011* (2013.01); *A47L 2201/04* (2013.01); *Y10S 901/01* (2013.01); *G05D 1/0219* (2013.01); *A47L 11/4061* (2013.01)
USPC ................. 701/23; 701/25; 701/300; 15/319; 134/18; 134/21; 901/1

(58) Field of Classification Search
CPC ............ A47L 11/4011; A47L 2201/04; A47L 11/4061; Y10S 901/01; G05D 1/0219
USPC ................. 701/23, 25, 256, 300; 134/1.2, 1.3, 134/25.4, 10.2, 61, 66, 95.2, 102.2, 902, 18, 134/21; 451/5, 8, 41, 67, 285, 287, 288, 451/339, 340.1; 700/245, 246, 249, 250, 700/256, 259; 414/217, 805, 935, 936, 937, 414/938, 939; 318/568.1, 568.12, 581, 587; 204/298.25, 298.35; 348/618, 689, 348/906; 156/345.34, 357.51, 345.32; 29/450, 557; 15/319, 383; 901/1, 46, 901/47; 118/715, 719; 239/708
See application file for complete search history.

(56) References Cited

U.S. PATENT DOCUMENTS 7,389,156 B2 * 6/2008 Ziegler et al. .................. 700/245
7,584,020 B2 * 9/2009 Bruemmer et al. ........... 700/245
(Continued)

OTHER PUBLICATIONS

Kim et al. Design Guideline of Anthropomorphic Sound Feedback for Service Robot Malfunction—with Emphasis on the Vacuum Cleaning Robot, 2009, IEEE, p. 352-557.*

*Primary Examiner* — McDieunel Marc
(74) *Attorney, Agent, or Firm* — Birch, Stewart, Kolasch & Birch, LLP (57) ABSTRACT

A cleaning robot cleaning a specific region and including a movement module, a sound wave module, a cleaning module and a controlling module is provided. The movement module includes a plurality of wheels. The sound wave module emits a sound wave and receives a plurality of reflected waves. The cleaning module performs a cleaning function. The controlling module generates a contour according to the reflected waves and controls at least one of the movement module and the cleaning module according to the contour.

20 Claims, 6 Drawing Sheets

(56) References Cited

U.S. PATENT DOCUMENTS

| | | | |
|---|---|---|---|
| 7,620,476 B2* | 11/2009 | Morse et al. | 700/245 |
| 7,620,477 B2* | 11/2009 | Bruemmer | 700/245 |
| 7,668,621 B2* | 2/2010 | Bruemmer | 700/245 |
| 7,679,997 B2* | 3/2010 | Kong et al. | 367/128 |
| 8,239,992 B2* | 8/2012 | Schnittman et al. | 15/41.1 |
| 8,347,444 B2* | 1/2013 | Schnittman et al. | 15/41.1 |
| 8,370,985 B2* | 2/2013 | Schnittman et al. | 15/41.1 |
| 2005/0251292 A1* | 11/2005 | Casey et al. | 700/245 |
| 2007/0118248 A1* | 5/2007 | Lee et al. | 700/245 |
| 2008/0016631 A1* | 1/2008 | Casey et al. | 15/3 |
| 2008/0039974 A1* | 2/2008 | Sandin et al. | 700/258 |
| 2008/0109126 A1* | 5/2008 | Sandin et al. | 701/23 |
| 2008/0276407 A1* | 11/2008 | Schnittman et al. | 15/319 |
| 2009/0055022 A1* | 2/2009 | Casey et al. | 700/258 |
| 2009/0254218 A1* | 10/2009 | Sandin et al. | 700/258 |
| 2009/0292393 A1* | 11/2009 | Casey et al. | 700/245 |
| 2011/0202175 A1* | 8/2011 | Romanov et al. | 700/250 |

* cited by examiner

CLEANING ROBOT AND CONTROL METHOD THEREOF

CROSS REFERENCE TO RELATED APPLICATIONS

This application claims the benefit of U.S. Provisional Application No. 61/606,106 filed on Mar. 2, 2012, and Taiwan Patent Application No. 101131975, filed on Sep. 3, 2012, the entirety of which is incorporated by reference herein.

BACKGROUND OF THE INVENTION

1. Field of the Invention

The invention relates to a cleaning robot, and more particularly, to a cleaning robot, which emits a sound wave and generates a contour according to reflected waves.

2. Description of the Related Art

Cleaning floors take a lot of time. To reduce the time for cleaning a floor, many cleaning devices have been developed, such as a broom, a mop and so forth. However, the cleaning devices must be manually operated for cleaning. Thus, conventional cleaning devices are inconvenient.

With technological development, many electronic devices have been developed, such as robots. Taking a cleaning robot as an example, the cleaning robot can autonomously execute a cleaning action. A user is not required to manually operate the cleaning robot to clean a floor. Thus, the cleaning robot has gradually replaced conventional cleaning devices. However, the conventional cleaning robot cleans different areas according to the same cleaning function. Thus, the conventional cleaning robot cannot provide different cleaning functions for different areas.

BRIEF SUMMARY OF THE INVENTION

An exemplary embodiment of a cleaning robot, which cleans a specific region, comprises a movement module, a sound wave module, a cleaning module and a controlling module. The movement module comprises a plurality of wheels. The sound wave module emits a sound wave and receives a plurality of reflected waves. The cleaning module performs a cleaning function. The controlling module generates a contour according to the reflected waves and controls at least one of the movement module and the cleaning module according to the contour.

A control method for a cleaning robot cleaning a specific region is provided. An exemplary embodiment of a control method for a cleaning robot is described in the following. The cleaning robot is controlled to move. Sound wave is emitted. A plurality of reflected waves are received. A contour is generated according to the reflected waves. At least one of a traveling path and a cleaning function of the cleaning robot is controlled according to the contour.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
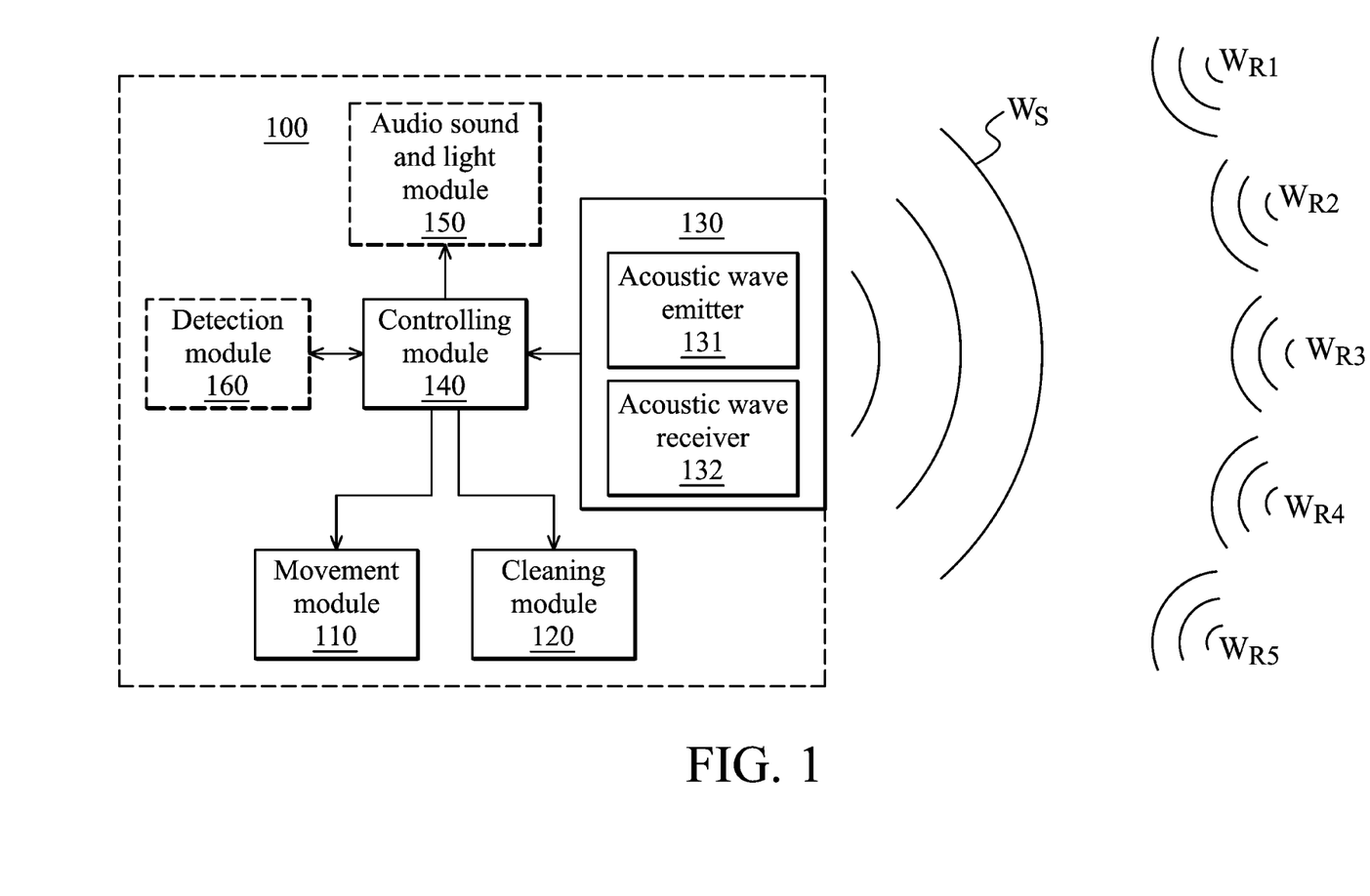
FIG. 1 is a schematic diagram of an exemplary embodiment of a cleaning robot.

FIG. 1 is a schematic diagram of an exemplary embodiment of a cleaning robot. The cleaning robot 100 cleans a specific region, such as a home. In this embodiment, the cleaning robot 100 comprises a movement module 110, a cleaning module 120, a sound wave module 130 and a controlling module 140.

The movement module 110 comprises a plurality of wheels (not shown). The cleaning robot 100 moves to any position via the wheels. The cleaning module 120 performs a cleaning function. The cleaning function may be to collect the dust on the floor of home or mop the floor of home. The invention does not limit the internal structure of the cleaning module 120. Any device can be disposed in the cleaning module 120, so as long as the device is capable of performing the cleaning function. For example, the cleaning module 120 may comprise a dust collection box, a fan and a cleaning brush.

The sound wave module 130 emits a sound wave $W_S$ and receives a plurality of reflected waves $W_{R1}$~$W_{R5}$. In one embodiment, the sound wave $W_S$ is an ultrasonic wave. In this embodiment, the sound wave module 130 comprises an acoustic wave emitter 131 and an acoustic wave receiver 132. The acoustic wave emitter 131 emits the sound wave $W_S$. The acoustic wave receiver 132 receives the reflected waves $W_{R1}$~$W_{R5}$. In other embodiments, the sound wave module 130 comprises a plurality of acoustic wave emitters and a plurality of acoustic wave receivers.

When the sound wave $W_S$ collides with an object, the object reflects the sound wave $W_S$ to generate at least one reflected wave. For example, when the sound wave $W_S$ collides with a wall, since the scope of the wall is wide, a plurality of reflected waves are generated by the wall. In this embodiment, FIG. 1 only shows the reflected waves $W_{R1}$~$W_{R5}$, but the disclosure does not limited thereto. In other embodiments, the number of the reflected waves may exceed or be less than 5.

In other embodiments, assume there are many objects around the cleaning robot 100. Many reflected waves are generated by the objects. According to the physical characteristics between the objects and the cleaning robot 100, the materials and the kinds of the objects, different reflected waves are generated at different times. The physical characteristics between the objects and the cleaning robot 100 may be an angle, a direction, a position or a speed.

The controlling module 140 generates a contour according to at least two reflected waves and controls at least one of the movement module 110 and the cleaning module 120 according to the contour. The invention does not limit the generation of the contour. In one embodiment, the controlling module 140 determines at least two positions of two objects according to the reflected waves received by the acoustic wave receiver 132. The controlling module 140 stores a map (not shown). The at least two positions are marked on the map. The controlling module 140 connects the at least two positions together to generate a contour. In one embodiment, the controlling module 140 stores the contour.

Additionally, the invention does not limit how the controlling module 140 controls the movement module 110 and the cleaning module 120. In one embodiment, the controlling module 140 controls the speed or the turning direction of the wheels of the movement module 110 to control a traveling path of the cleaning robot 100. In another embodiment, the controlling module 140 controls the cleaning module 120 to adjust a cleaning function of the cleaning robot 100.

Figure 2:
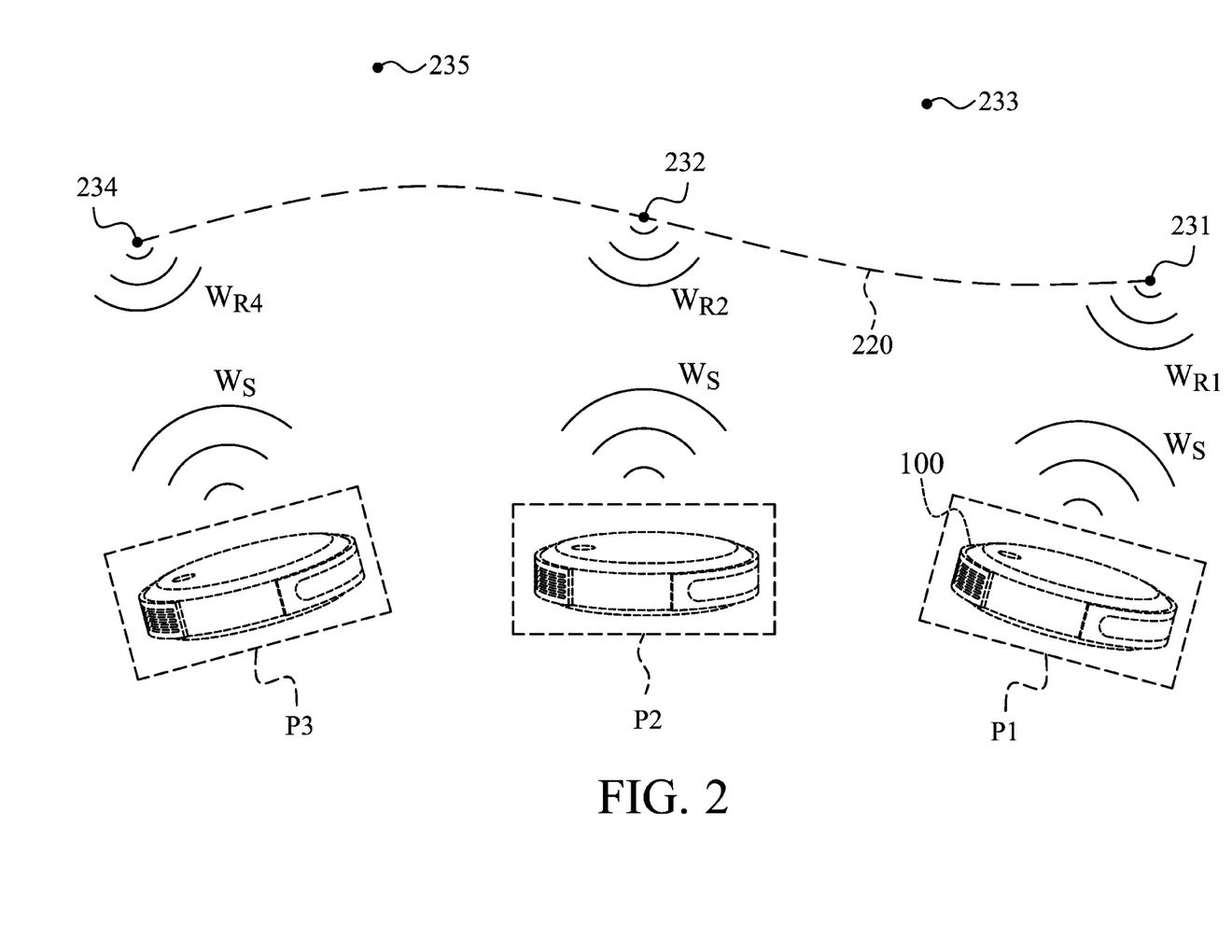
FIG. 2 is a schematic diagram of an exemplary embodiment of a contour.

FIG. 2 is a schematic diagram of an exemplary embodiment of a contour. When the cleaning robot 100 moves to a position P1, the objects 231~235 generate corresponding reflected waves. However, the reflected wave $W_{R1}$ generated by the object 231 is first received by the cleaning robot 100 because the object 231 is closest to the cleaning robot 100. In this embodiment, the cleaning robot 100 records the reflected wave $W_{R1}$.

When the cleaning robot 100 moves to the position P2, the reflected wave $W_{R2}$ generated by the object 232 is first received by the cleaning robot 100 because the object 232 is closest to the cleaning robot 100. The cleaning robot 100 records the reflected wave $W_{R2}$.

Finally, the cleaning robot 100 moves to the position P3. Since the object 234 is closest to the cleaning robot 100, the reflected wave $W_{R4}$ generated by the object 234 is first received by the cleaning robot 100. The cleaning robot 100 records the reflected wave $W_{R4}$.

The cleaning robot 100 processes the reflected waves $W_{R1}$, $W_{R2}$ and $W_{R4}$ to form a contour 220. In other embodiments, a contour is generated by processing at least two reflected waves. In this embodiment, the contour 220 is a smooth curve. The slopes of all sections of the contour 220 are less than a pre-determined slope. Thus, the controlling module 140 controls at least one of the movement module 110 and the cleaning module 120 according to the slope of the contour in one embodiment.

The so-called slope is for a certain point in the contour. For example, any point in the contour has a corresponding slope. In other embodiments, the controlling module 140 controls at least one of the movement module 110 and the cleaning module 120 according to a curvature of the contour. The so-called curvature refers to the curved degree of a certain section of the contour.

Figure 3:
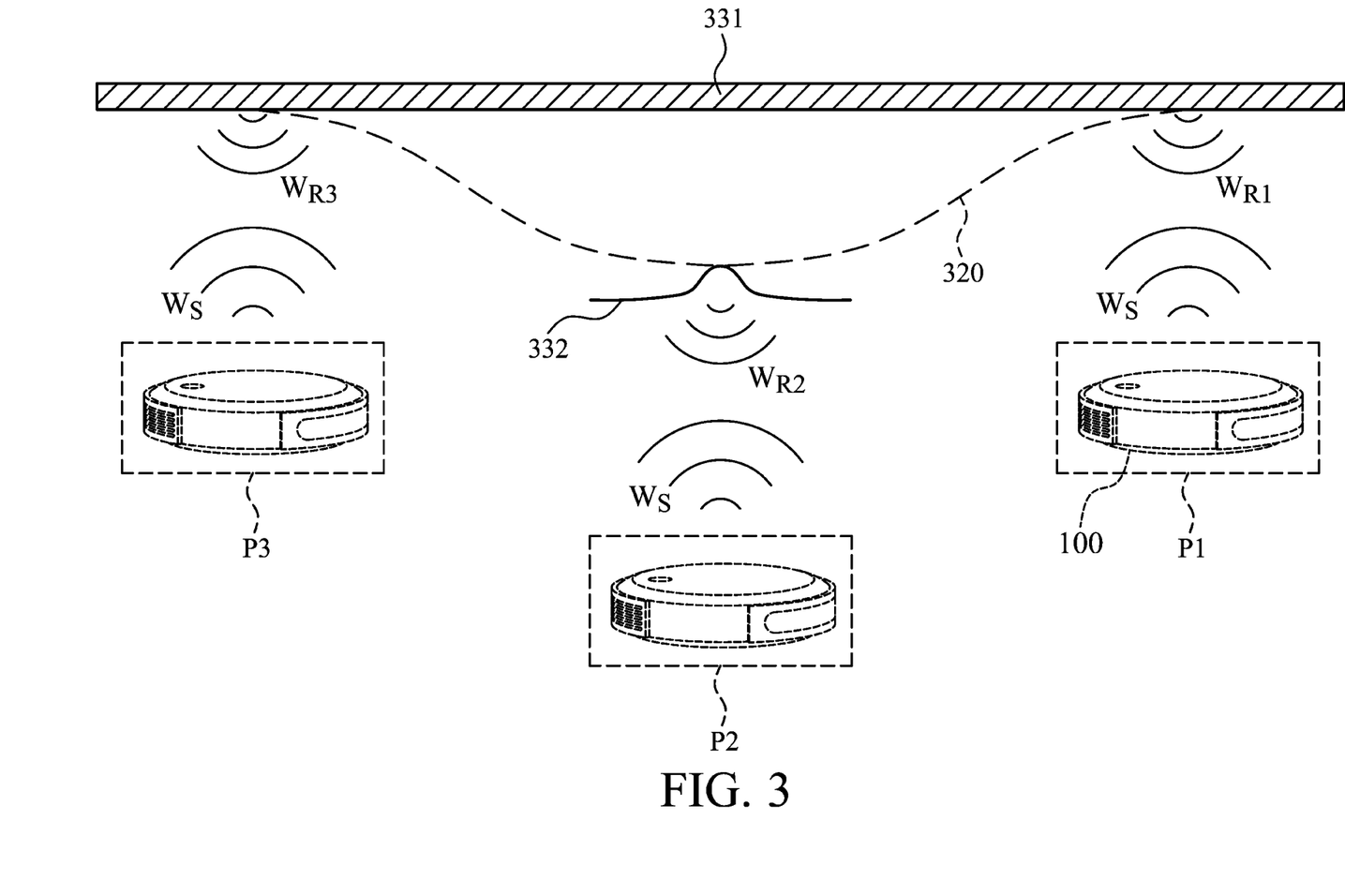
FIG. 3 is a schematic diagram of another exemplary embodiment of a contour.

FIG. 3 is a schematic diagram of another exemplary embodiment of a contour. When the cleaning robot 100 moves to the position P1, since the wall 331 is closest the cleaning robot 100, the reflected wave $W_{R1}$ generated by the wall 331 is first received by the cleaning robot 100. Similarly, when the cleaning robot 100 moves to the position P2, since the object 332 is closest the cleaning robot 100, the reflected wave $W_{R2}$ generated by the object 332 is first received by the cleaning robot 100. When the cleaning robot 100 moves to the position P3, since the wall 331 is closest the cleaning robot 100, the reflected wave $W_{R3}$ generated by the wall 331 is first received by the cleaning robot 100.

The controlling module 140 obtains a contour 320 according to the reflected waves $W_{R1}$~$W_{R3}$. The controlling module 140 controls the traveling path of the cleaning robot 100 according to the contour 320. In one embodiment, the controlling module 140 controls the cleaning robot 100 to leave the object 332 according to the contour 320. Thus, the cleaning robot 100 does not collide with the object 332. In another embodiment, the controlling module 140 controls the cleaning robot 100 to approach the object 332 and clean around object 332.

For example, assume the object 332 is a raised area of the floor of a home. Since the raised area easily accumulates dust, the controlling module 140 increases the cleaning function of the cleaning module 120 and increases the speed of the wheels of the movement module 110 to climb the raised area and clean the raised area.

In this embodiment, the controlling module 140 determines the raised areas and the recessed areas of a specific region, wherein the cleaning robot 100 moves in the specific region. The controlling module 140 controls at least one of the movement module 110 and the cleaning module 120 according to the raised areas and the recessed areas. For example, the controlling module 140 controls the movement module 110 to prevent the cleaning robot 100 from being trapped in a recessed area or a raised area. However, if the slope of the raised area or the slope of the recessed area is small, the controlling module 140 controls the cleaning robot 100 to enter the recessed area or the raised area. The controlling module 140 increases the cleaning function of the cleaning module 120 to clean the recessed area or the raised area because the recessed area or the raised area may easily accumulate dust.

Figure 4A:
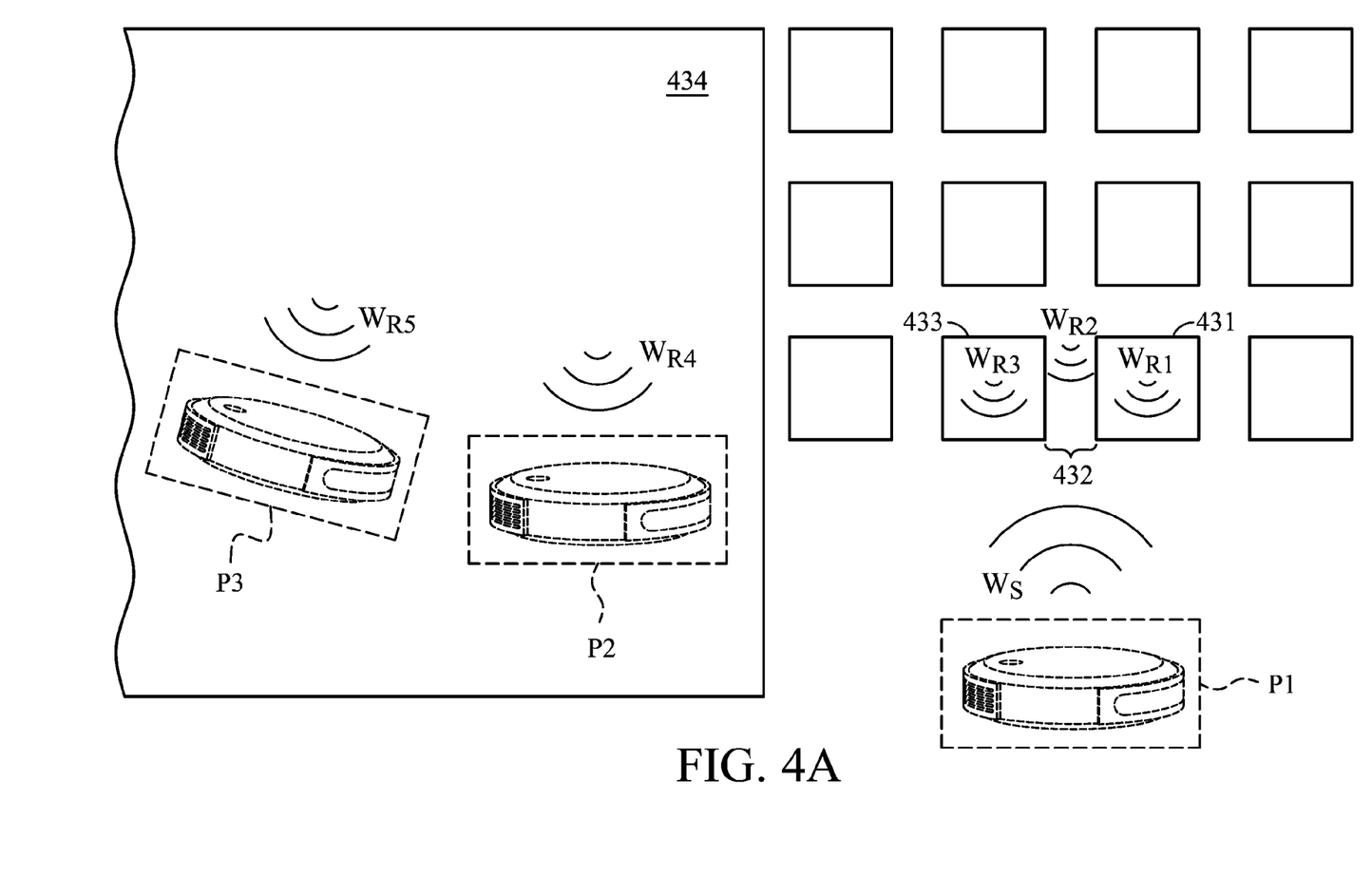
FIG. 4A is a schematic diagram of an exemplary embodiment of an external environment of a cleaning robot.
Figure 4B:
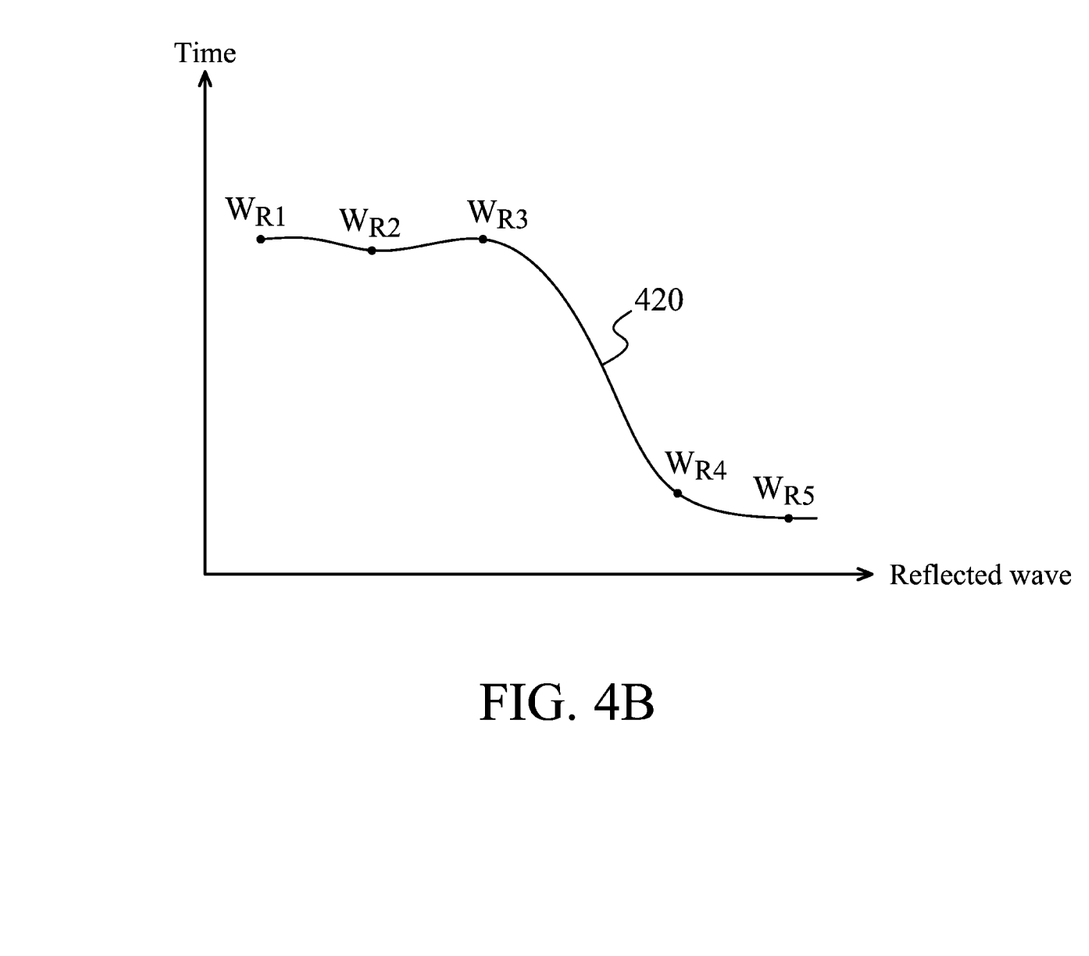
FIG. 4B is a schematic diagram of an exemplary embodiment of a contour according to the external environment.

FIG. 4A is a schematic diagram of an exemplary embodiment of an external environment of a cleaning robot. FIG. 4B is a schematic diagram of an exemplary embodiment of a contour according to the external environment. As shown in FIG. 4A, when the sound wave module 130 emits the sound wave $W_S$, a floor generates the reflected waves $W_{R1}$~$W_{R5}$ according to the sound wave $W_S$. In this embodiment, the floor comprises tile areas 431, 433, a gap area 432 and a rug area 434. The reflected waves $W_{R1}$ and $W_{R3}$ are generated by the tile areas 431 and 433, respectively. The reflected wave $W_{R2}$ is generated by the gap area 432. The reflected waves $W_{R4}$ and $W_{R5}$ are generated by the rug area 434.

As shown in FIG. 4B, the time points when the areas with different materials produce the reflected waves are different. For example, when the cleaning robot 100 emits the sound wave $W_S$ and moves to the position P1, since the tile areas 431 and 433 are closest to the cleaning robot 100, the cleaning robot 100 first receives the reflected waves $W_{R1}$ and $W_{R3}$ and then receives the reflected wave $W_{R2}$. In addition, when the cleaning robot 100 moves onto the rug area 434, or in the positions P2 and P3, since the rug area 434 is closest to the cleaning robot 100, the cleaning robot 100 first receives the reflected waves $W_{R4}$ and $W_{R5}$ and then receives the reflected waves $W_{R1}$ and $W_{R3}$.

In this embodiment, the controlling module 140 determines the materials of the areas according to a contour 420 generated by the reflected waves $W_{R1}$~$W_{R5}$. The controlling module 140 determines that the cleaning robot is moving on a hard floor or on a soft floor. For example, when the sound wave $W_S$ is reflected from a hard floor, such as tile areas, the intensity of the reflected waves, such as the reflected waves $W_{R1}$~$W_{R3}$, is within a pre-determined range. However, when the sound wave $W_S$ is reflected from a soft floor, such as a rug area, the intensity of the reflected waves, such as the reflected waves $W_{R4}$~$W_{R5}$, is not within the pre-determined range.

Therefore, when the controlling module 140 controls at least one of the movement module 110 and the cleaning module 120 according to a contour 420 generated by the reflected waves $W_{R1}$~$W_{R5}$, the cleaning robot 100 is capable of performing a cleaning function according to the state of the external environment. For example, when the cleaning robot 100 moves from a tile area to a rug area, the controlling module 140 first increases the speed of the wheels to successfully enter the rug area. After entering the rug area, the controlling module 140 reduces the speed of the wheels and increases the cleaning function of the cleaning module 120 to thoroughly clean the rug area.

Furthermore, as shown in FIG. 4A, a gap area 432 exists between the tile areas 431 and 433. The controlling module 140 is capable of obtaining the gap 432 according to the intensity of the reflected wave $W_{R2}$. Since the gap 432 easily accumulates dust, the controlling module 140 increases the cleaning function of the cleaning module 120 for the gap 432.

Since the time points when different objects or objects with different materials generate reflected waves are different, when the controlling module 140 generates a contour according to many reflected waves, the controlling module 140 is capable of determining the kind or the material of the object or a physical characteristic between the object and the cleaning robot 100. The physical characteristic between the objects and the cleaning robot 100 may be an angle, a direction, a position or a speed When the controlling module 140 controls at least one of the traveling path or the cleaning function of the cleaning robot 100 according to the determined result, the cleaning robot 100 is capable of implementing a cleaning function according to the state of external environment. Since the cleaning robot 100 provides different cleaning functions for the state of the external environment, an adaptability of the cleaning robot 100 can be increased.

For example, the controlling module 140 controls the speed and the turning direction of the wheels of the movement module 110 according to a contour. Thus, the operation of the cleaning robot 100 can be controlled. For example, the operation of the cleaning robot 100 may be stopped or started. The speed of the cleaning robot may be increased or reduced. The cleaning robot may rotate or cruise. Furthermore, the controlling module 140 controls a suction force, an air flow or the speed of a cleaning brush of the cleaning module 120 according to the contour.

In other embodiments, the cleaning robot 100 further comprises an audio sound and light module 150. The audio sound and light module 150 provides at least one of sound effects and light effects. The controlling module 140 controls the audio sound and light module 150 to adjust at least one of the sound effects and the light effects according to a contour. In one embodiment, the audio sound and light module 150 comprises a speaker (not shown) and a display device (not shown) to provide sound effects and light effects, respectively. Thus, a user may determine the operation state of the cleaning robot 100 according to different sound effects or different light effects. For example, a user determines that the cleaning robot 100 is trapped in a specific area.

The controlling module 140 is capable of identifying a specific dynamic environment, a static environment or a specific object according to the contour of the environment. The specific object may be a docking station, a remote control, a virtual wall, a person or an apparatus. Further, the controlling module 140 can adjust the data transfer format between the cleaning robot 100 and the environment according to the contour of the environment.

For example, the cleaning robot 100 first utilizes a sound wave or light to identify an object of the environment. After generating a contour, the cleaning robot 100 utilizes another method, such as optic signals or magnetic signals, to communicate with the object of the environment. In other embodiments, the cleaning robot 100 communicates with the object of the environment according to the variation of the behavior of the cleaning robot 100.

In this embodiment, the cleaning robot 100 further comprises a detection module 160. The detection module 160 detects the state of the environment of the cleaning robot 100. The controlling module 140 activates the detection module 160 according to a contour such that the cleaning robot 100 utilizes another method to communicate with the object of the environment. In one embodiment, the controlling module 140 controls at least one of the movement module 110, the cleaning module 120 and the audio sound and light module 150 according to the detection result generated by the detection module 160.

In one embodiment, a user can determine which wireless method the cleaning robot should utilize to communicate with object around the cleaning robot according to the sound effects and the light effects provided by the audio sound and light module 150.

Figure 5:
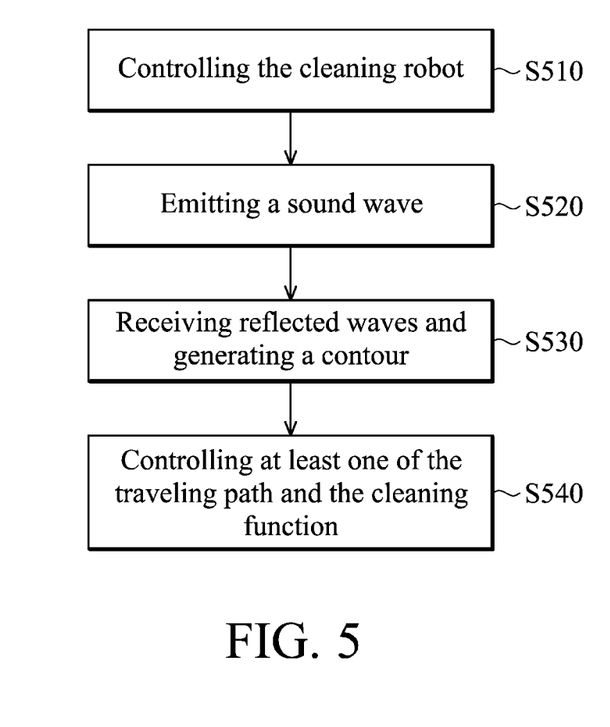
FIG. 5 is a schematic diagram of an exemplary embodiment of a control method of the invention.

FIG. 5 is a schematic diagram of an exemplary embodiment of a control method of the invention. The control method controls a cleaning robot to perform a cleaning action. First, the cleaning robot is controlled to move (step S510), and simultaneously, a sound wave is emitted (step S520). In one embodiment, the sound wave is an ultrasonic wave.

Reflected waves are received (step S530). When the sound wave collides with an external object, the external object reflects the sound wave to generate at least one reflected wave. A contour is generated according to at least two reflected waves in step S530. The invention does not limit the generation of the contour. As shown in FIGS. 2, 3 and 4B, many positions of the external objects are connected to form a contour. The so-called connection is not really to connect to the external objects. In fact, the cleaning robot forms a map according to the reflected waves, marks the corresponding positions of the external objects on the map and then connects the corresponding positions on the map to form a contour.

At least one of the traveling path and the cleaning function of the cleaning robot is controlled according to the contour (step S540). In one embodiment, the time points when the cleaning robot receives the reflected waves relate to the positions of the objects, the kinds of the objects and the materials of the objects. Thus, the positions of the objects, the kinds of the objects and the materials of the objects can be determined according to the contour formed by the reflected waves. In one embodiment, the positions of the objects, the kinds of the objects and the materials of the objects are determined according to the slope or the curvature of the contour.

In this embodiment, since at least one of the traveling path and the cleaning function of the cleaning robot is controlled according to the contour, an adaptability of the cleaning robot to the environment can be increased. For example, the kinds of the objects can be determined according to the contour. The objects may be walls, obstacles or raised areas of floors of a home.

In one embodiment, assume that the object determined, is a wall. The cleaning robot moves along the wall. In other embodiments, assume that the object determined, is a raised area of the floor of a home. The cleaning robot avoids the raised area. In other embodiments, the cleaning function of the cleaning robot is increased for the raised area.

In another embodiment, the materials of a specific region are determined according to the contour, wherein the cleaning robot is in the specific region. The specific region may be tile areas, or rug areas. The cleaning robot provides different moving speeds, such as a slow moving speed or a fast moving speed, or different cleaning functions, such as a high cleaning function or a low cleaning function according to the different materials of the specific region.

Furthermore, raised areas and recessed areas of the specific region are determined according to the contour. When at least one of the traveling path and the cleaning function of the cleaning robot is controlled according to the contour, the adaptability of the cleaning robot can be increased.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A cleaning robot cleaning a specific region, comprising:
   a movement module comprising a plurality of wheels;
   a sonar module emitting a sonar and receiving a plurality of reflected waves;
   a cleaning module performing a cleaning function; and
   a controlling module generating a contour according to the reflected waves and controlling at least one of the movement module and the cleaning module according to the contour.

2. The cleaning robot as claimed in claim 1, wherein the sonar module comprises:
   an acoustic wave emitter emitting the sonar; and
   an acoustic wave receiver receiving the reflected waves.

3. The cleaning robot as claimed in claim 1, wherein the reflected waves are generated from at least one object.

4. The cleaning robot as claimed in claim 3, wherein the controlling module determines a physical characteristic between the cleaning robot and the object according to the contour and controls at least one of the movement module and the cleaning module according to the physical characteristic.

5. The cleaning robot as claimed in claim 3, wherein the controlling module determines a kind of the object according to the contour and controls at least one of the movement module and the cleaning module according to the kind of the object.

6. The cleaning robot as claimed in claim 3, wherein the controlling module determines a material of the specific region according to the contour and controls at least one of the movement module and the cleaning module according to the material of the specific region.

7. The cleaning robot as claimed in claim 3, wherein the controlling module determines raised areas and recessed areas of the specific region according to the contour and controls at least one of the movement module and the cleaning module according to the raised areas and the recessed areas of the specific region.

8. The cleaning robot as claimed in claim 1, wherein the controlling module controls at least one of the movement module and the cleaning module according to a slope of the contour or a curvature of the contour.

9. The cleaning robot as claimed in claim 1, wherein the controlling module controls at least of one of the speed of the wheels and turning direction of the wheels according to the contour.

10. The cleaning robot as claimed in claim 1, wherein the controlling module controls a cleaning function of the cleaning module according to the contour.

11. The cleaning robot as claimed in claim 1, further comprising:
    a audio sound and light module providing at least one of a sound effect and a light effect, wherein the controlling module controls the audio sound and light module to adjust at least one of the sound effect and the light effect according to the contour.

12. The cleaning robot as claimed in claim 11, further comprising:
    a detection module detecting an environment to generate a detection result, wherein the controlling module activates the detection module according to the contour and controls at least one of the movement module, the cleaning module and the audio sound and light module according to the detection result.

13. The control method as claimed in claim 1, wherein after the controlling module generates the contour, the cleaning robot utilizes optic signals or magnetic signals to communicate with an object, and the object is one of a docking station, a remote control, a virtual wall, a person or an apparatus.

14. A control method for a cleaning robot cleaning a specific region, comprising:
    controlling the cleaning robot to move;
    emitting a sonar;
    receiving a plurality of reflected waves;
    generating a contour according to the reflected waves; and
    controlling at least one of a traveling path and a cleaning function of the cleaning robot according to the contour.

15. The control method as claimed in claim 14, wherein the reflected waves are generated by at least one object.

16. The control method as claimed in claim 14, further comprising:
    according to the contour, determining a physical characteristic between the cleaning robot and the object, wherein the at least one of the movement module and the cleaning module is controlled according to the physical characteristic.

17. The control method as claimed in claim 14, further comprising:
    according to the contour, determining a kind of the object, wherein the at least one of the movement module and the cleaning module is controlled according to the kind of the object.

18. The control method as claimed in claim 14, further comprising:
    according to the contour, determining a material of the specific region, wherein the at least one of the movement module and the cleaning module is controlled according to the material of the specific region.

19. The control method as claimed in claim 14, further comprising:
    according to the contour, determining raised areas and recessed areas of the specific region, wherein the at least one of the movement module and the cleaning module is controlled according to the raised areas and the recessed areas of the specific region.

20. The control method as claimed in claim 14, wherein the controlling module controls at least one of the movement module and the cleaning module according to a slope of the contour or a curvature of the contour.

* * * * *